United States Patent [19]
Campbell

[11] Patent Number: 5,970,620
[45] Date of Patent: Oct. 26, 1999

[54] MEASURING DEVICE FOR USE BY FISHERMEN

[76] Inventor: Michael Campbell, 320 Beaver Run Rd., Ottsville, Pa. 18942

[21] Appl. No.: 09/024,309

[22] Filed: Feb. 17, 1998

[51] Int. Cl.⁶ .............................. G01B 1/00; G01B 5/00; B43L 7/00
[52] U.S. Cl. .................... 33/511; 33/485; 33/783
[58] Field of Search .................... 33/485 R, 492, 33/494, 511, 549, 553, 712, 783, 679.1; D10/70, 71; 43/4, 5; 177/127, 148

[56] References Cited

U.S. PATENT DOCUMENTS

| D. 388,345 | 12/1997 | Burns | D10/71 |
|---|---|---|---|
| 2,750,184 | 6/1956 | Warndahl | 177/127 |
| 5,148,607 | 9/1992 | Lasiter | 33/549 |
| 5,228,226 | 7/1993 | Porosky | 43/5 |
| 5,339,532 | 8/1994 | O'keefe | 33/511 |
| 5,526,575 | 6/1996 | Hoover et al. | 33/485 |
| 5,637,838 | 6/1997 | Arey et al. | 177/148 |

*Primary Examiner*—Max Noori
*Assistant Examiner*—Abdullahi Aw-Musse
*Attorney, Agent, or Firm*—LaMorte & Associates

[57] ABSTRACT

A measuring device for measuring aquatic creatures such as fish, crustaceans and shellfish. The measuring device includes a planar element having an elongated body that extends between two ends. At least one marking disposed on said elongated body between the two ends. A predetermined distance exists between each marking and one of said ends. Each predetermined distance corresponds to the legal minimum length of at least one species of fish. Protrusions extend from the elongated body of the planar element. A predetermined distance exists between each protrusion and one of the ends of the planar element. The predetermined distance corresponds to the minimum acceptable length of either a crustacean or a shellfish. As such, the present invention measuring device can be utilized as a yes/no gauge for a plurality of different species of fish, crustaceans and shellfish without the need for adjustment.

16 Claims, 5 Drawing Sheets

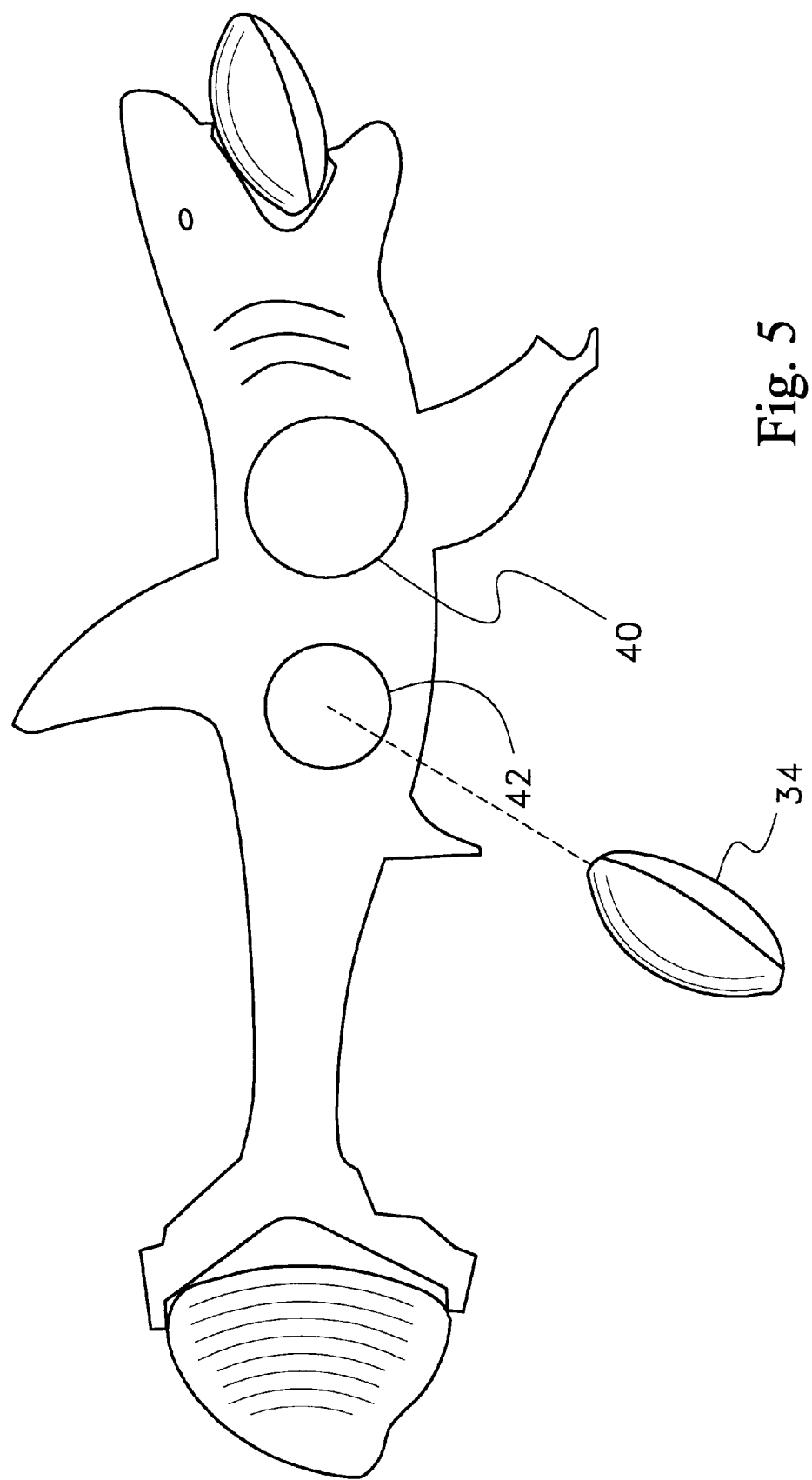

MEASURING DEVICE FOR USE BY FISHERMEN

BACKGROUND OF THE INVENTION

1. Field of the Invention

The present invention relates to measurement devices for measuring fish, crustaceans and shellfish. More particularly, the present invention relates to measurement scales that inform a fisherman as to whether a fish, crustacean or shellfish is larger than the legal size permissible for capture.

2. Description of the Prior Art

There are many federal, state and local laws and regulations that limit the size of fish, crustaceans and shellfish that can be caught by a fisherman. The purpose of placing limits on the size of different species is to ensure that juvenile animals are not harvested before they have been given a chance to reproduce. This ensures that the population of the various fish, crustaceans and shellfish will not be depleted to a point where that species will become endangered.

The legal size limit for different species of sea life vary from species to species. Fish are typically measured by the length of there bodies between their nose and tail. Different species of fish have different minimum acceptable lengths.

Crustaceans such as lobsters and crabs are measured in different ways. Lobsters are measured from the collar of the neck to the tip of the tail. Crabs are measured by the width of their shells. Different species of crabs have different acceptable minimum shell sizes.

Shellfish, such as clams, scallops, muscles and the like are measured by either the width, thickness or girth of their shells, depending upon the species of shellfish and the local regulations. However, commonly if the shells of the shellfish can be passed through an aperture of a predetermined diameter, then they are too small to harvest.

When a fisherman goes to the beach and fishes or goes to a lake to fish, that fisherman never knows what kind of species of fish he/she will catch. A fisherman must therefore have the ability to measure that fish and determine if that fish meets the legal length limit. In the prior art, there have been many measurement devices designed for fishermen. Such prior art devices are exemplified by U.S. Pat. No. 5,097,617 to Craven, entitled Apparatus For Measuring Fish; U.S. Pat. No. 5,339,532 to O'Keefe, entitled Fish Length Measuring Device; and U.S. Pat. No. 5,228,226 to Porosky.

Although such prior art measurement devices give a fisherman the ability to measure different fish, such prior art devices are not designed to accommodate crustaceans or shellfish. When a fisherman fishes at the beach, the fisherman will often reel in a lobster or a crab that has snagged on the bait. If the fisherman had a prior art measuring device, the fisherman would not be able to accurately determine if the crustacean is of a legal size. Similarly, fisherman who fish with nets from ships often net numerous crustaceans along with fish. The fisherman must then have different measurement scales to determine if the fish and crustaceans are legal catches.

Fish and crustaceans that are pulled from the water must be measured and returned to the water rapidly so that the creatures do not die or otherwise become injured. Measuring devices must therefore be easy and quick to use. Many prior art measurement devices require that the measurement device be adjusted for each different species of fish. Obviously, such measurement devices are not useful for net fishermen who catch a large number of fish at the same time and the species of fish caught are widely varied.

Fisherman who fish at the beach often search for clams and collect muscles as they wait for fish to strike at the bait. In such a manner, a fisherman can return home with a catch of both fish and shellfish. The measurement devices used to measure shellfish are quite different than those used to measure fish. Shellfish are not measured by their length. Measuring scales for shellfish contain apertures for measuring the girth of the shells of the different species. As a result, a length measuring device designed for measuring fish is not very useful in measuring the girth of shellfish.

A need therefore exists in the art for a measuring device that can be used by fishermen that quickly and easily can be used to measure many different species of fish, crustaceans and shellfish. This need is met by the present invention as described and claimed below.

SUMMARY OF THE INVENTION

The present invention is a measuring device for measuring aquatic creatures such as fish, crustaceans and shellfish. The measuring device includes a planar element having an elongated body that extends between two ends. At least one marking is disposed on the elongated body between the two ends. A predetermined distance exists between each marking and one of the ends. Each predetermined distance corresponds to the legal minimum length of at least one species of fish.

Protrusions extend from the elongated body of the planar element. A predetermined distance exists between each protrusion and one of the ends of the planar element. The predetermined distance corresponds to the minimum acceptable length of either a crustacean or a shellfish. As such, the present invention measuring device can be utilized as a yes/no gauge for a plurality of different species of fish, crustaceans and shellfish without the need for adjustment. A fisherman can therefore catch many different species of fish, crustaceans and shellfish and check the legal size of those animals with only a single gauge.

BRIEF DESCRIPTION OF THE DRAWINGS

For a better understanding of the present invention, reference is made to the following description of an exemplary embodiment thereof, considered in conjunction with the accompanying drawings, in which:

FIG. 5 is a side view of the embodiment of FIG. 1 shown in conjunction with a clam to illustrate a method of use.

DETAILED DESCRIPTION OF THE INVENTION

The present invention is a measuring device that is capable of measuring fish, crustaceans and shellfish. The measuring device is designed to measure the most commonly caught fish, crustaceans and shellfish in a particular region of the world. As such, the design of the present invention measuring device would vary from region to region. By way of example, an embodiment is described that is for use with fisherman who fish in the Atlantic ocean from the north easter section of the United States. The fish indigenous to such fisherman include blue fish, flounder, sea bass and the like. Crustaceans indigenous to the selected waters include lobsters and a variety of different edible crabs. The most prominent edible shellfish indigenous to the selected waters includes clams and muscles. Accordingly, the present invention measuring device as described will have the ability to quickly and easily measure the above mentioned fish, crustaceans and shellfish.

Figure 1:
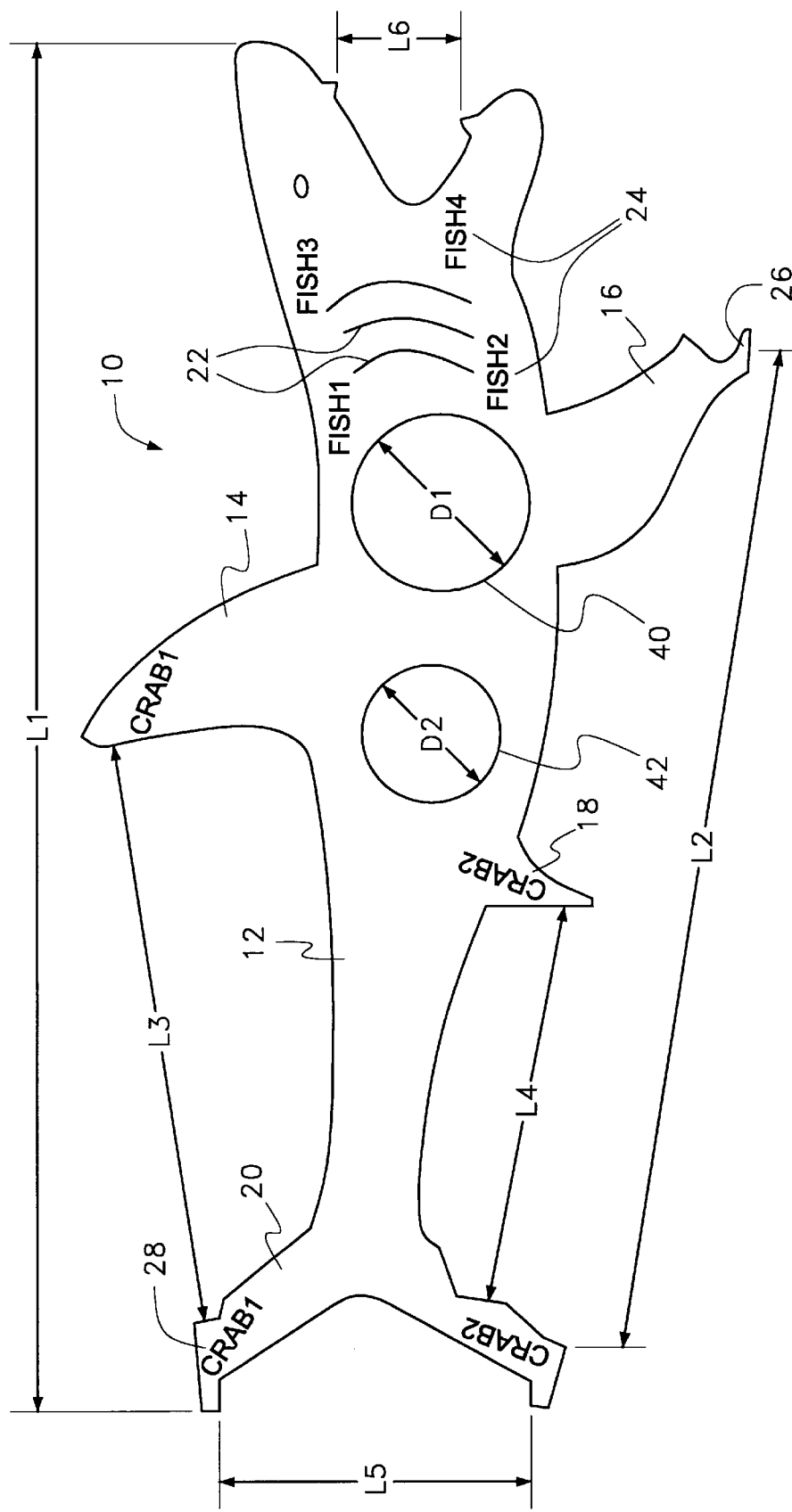
FIG. 1 is a side view of one preferred embodiment of a measuring device in accordance with the present invention.

Referring to FIG. 1, there is shown a first embodiment of a measuring device 10 in accordance with the present invention. The measuring device 10 has a body 12 that is a generally planar element with a peripheral edge formed into the shape of a fish. In the shown embodiment, the displayed fish is a shark, however, other types of fish can also be selected. Regardless of the fish shape selected, it is preferred that the fish have a dorsal fin 14, a pectoral fin 16, a pelvic fin 18 and a tail fin 20. As will be explained, the spacing between various fins and reference points are used as measurement scales for different types of fish, crustaceans and shellfish.

The body 12 of the measurement device 10 has a maximum length L1 as measured from the tip of the nose of the displayed fish to the tail fin 20 of the displayed fish. The maximum length L1 is selected to match the minimum legal length of the largest species of fish likely to be caught. For example, if in a particular body of water a fish with the largest minimum is a fish with a fourteen inch minimum, the maximum length L1 of the measuring device will be would be fourteen inches.

A plurality of markings 22 are positioned on the body 12 of the measurement device 10. These markings 22 can be disguised as gills or other natural occurring points on the displayed fish. Each one of the markings 22 is a predetermined length from the end of the tail fin 20. Each marking 22 corresponds to a predetermined minimum length of a fish. Each of the markings 22 is identified with an indicia 24 that identify the species of fish corresponding to that marking.

Figure 2:
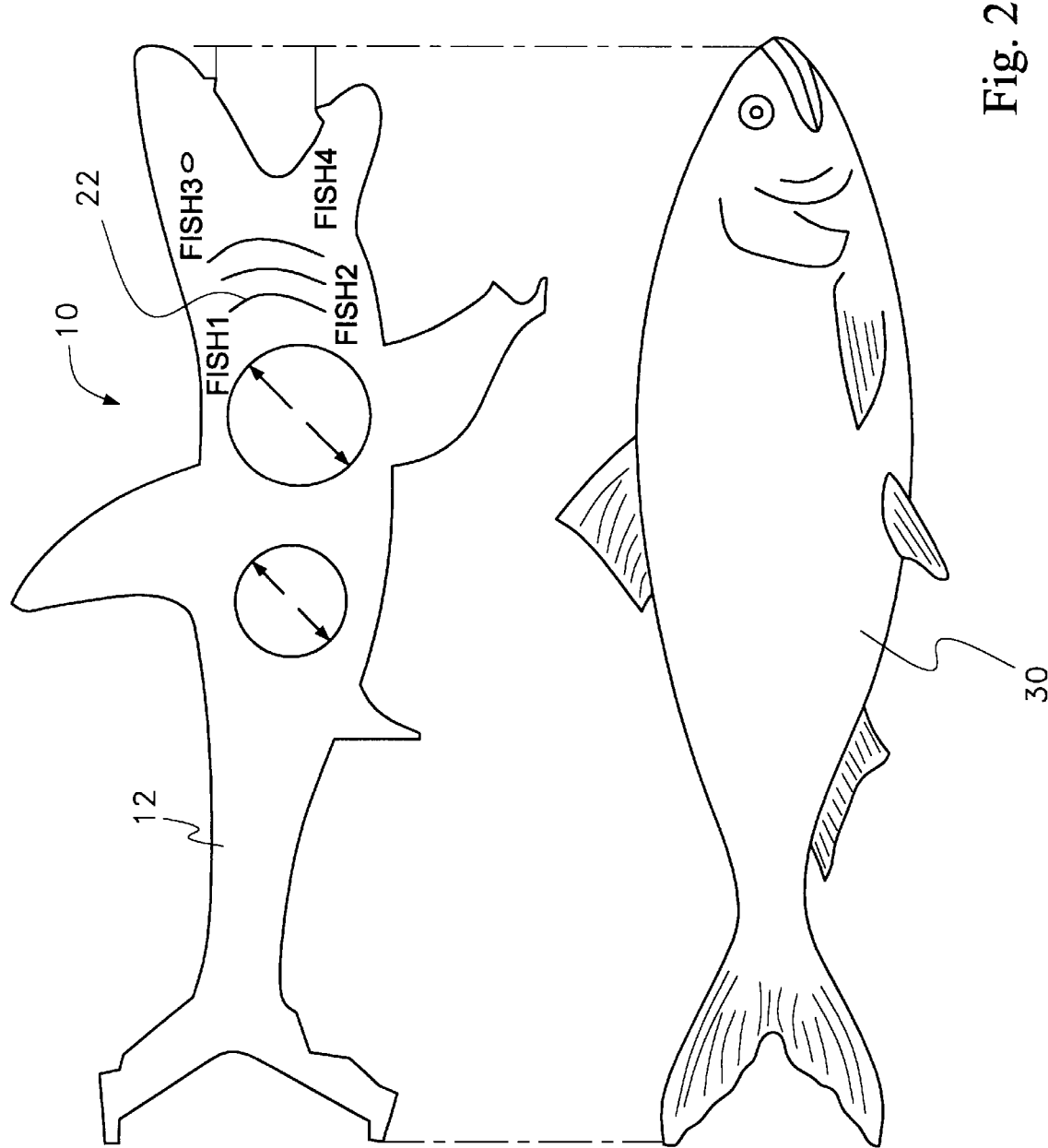
FIG. 2 is side view of the embodiment of FIG. 1 shown in conjunction with a fish to illustrate a method of use.

Referring to FIG. 2, it can be seen that when a fish 30 is caught, the fish 30 is placed against the body 12 of the measuring device 10. The tail fin of the caught fish 30 is aligned with the tail fin 20 of the displayed fish. The length of the fish 30 on the body 12 of the measuring device 20 is then noted. If the length of the fish 30 is surpasses the marking 22 for that species of fish, then the fish 30 surpasses the legal limit and can be kept. Alternatively, if the fish 30 is shorter than the marking 22 for that species, the fish should be immediately returned to the water.

Figure 3:
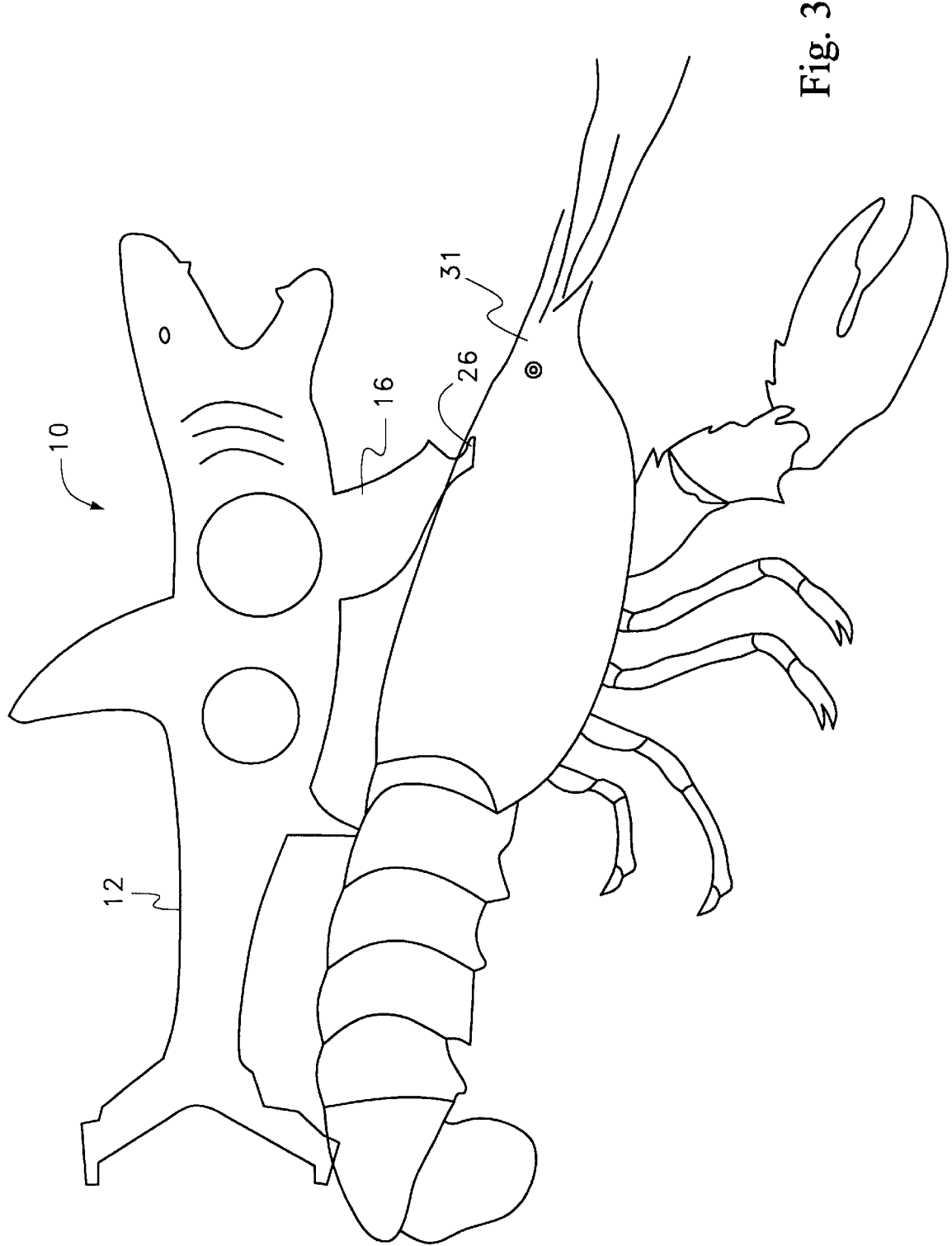
FIG. 3 is side view of the embodiment of FIG. 1 shown in conjunction with a lobster to illustrate a method of use.

Returning to FIG. 1, it can be seen that a predetermined length L2 exists between the tip of the pectoral fin 16 and the tail fin 20. The predetermined length L2 corresponds to the legal minimum length of a crustacean such as a lobster. The tip of the pectoral fin terminates with a small hooked structure 26. When lobsters are caught, they are measured from the collar of the neck to the tail. Referring to FIG. 3, it can be seen that the hook structure 26 at the tip of the pectoral fin 16 is adapted to engage the collar of the lobster's neck. The lobster 31 is engaged by the hook structure 26 and stretched toward the tail fin 20 of the measuring device 10. If the tail of the lobster 31 surpasses the tail fin 20 of the measuring device 10, then the lobster 31 is large enough to keep. If the lobster's tail does not extend to the tail fin 20 of the measuring device 10, then the lobster 31 must be returned to the water.

Figure 4:
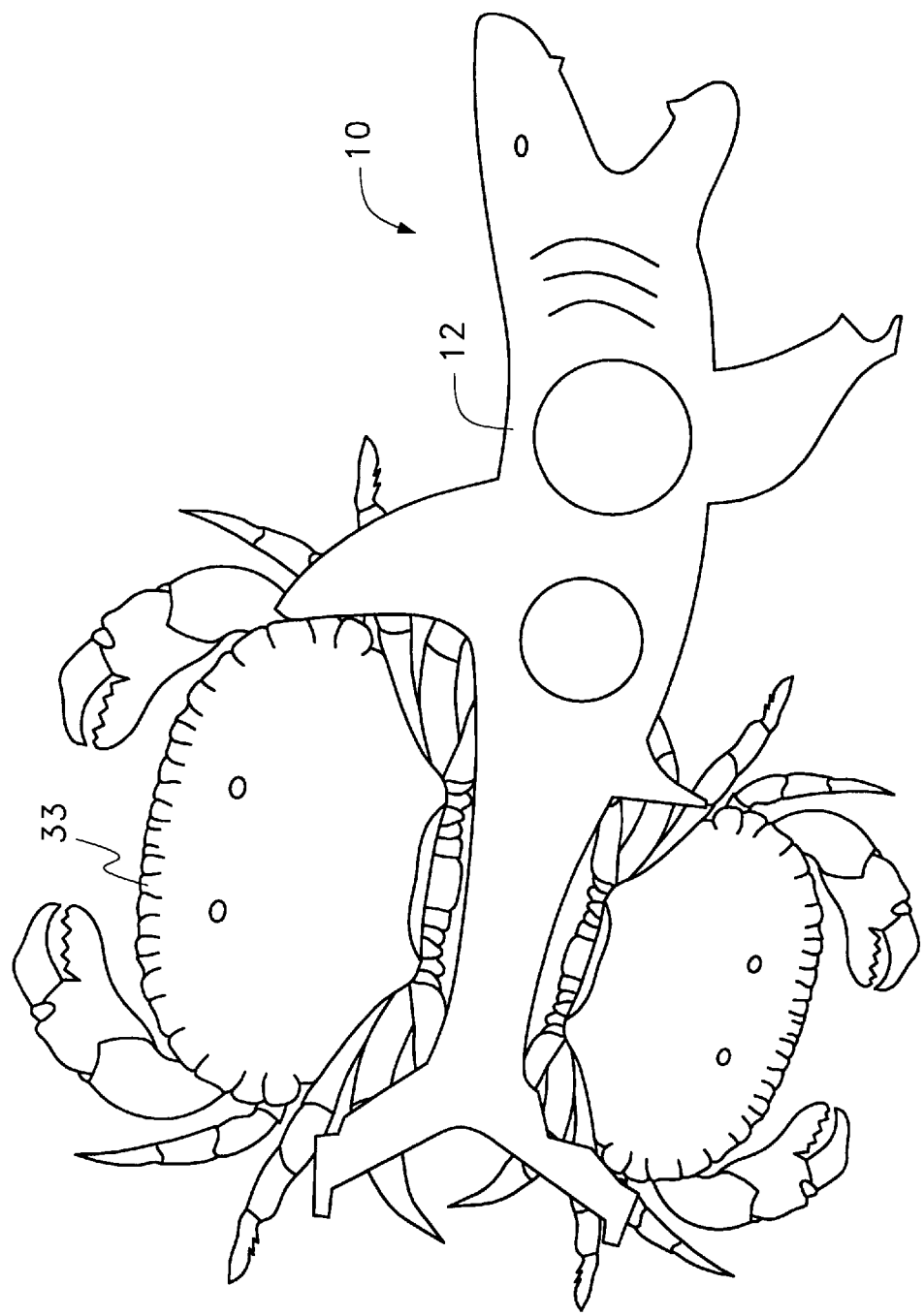
FIG. 4 is a side view of the embodiment of FIG. 1 shown in conjunction with a crab to illustrate a method of use.

Returning to FIG. 1, it can be seen that predetermined length L3, L4, L5 exist between the tip of the various fins. The predetermined lengths L3, L4, L5, correspond to the legal minimum widths of shellfish and/or crustaceans such as crabs. Since many marine areas are home to many different species of crab, the distances between fins is varied to provide the legal minimum length for the most common types of crabs. Indicia 28 is printed on the body 12 of the measuring device 10 to inform a fisherman which type of crab should be measured between the various fins. Referring to FIG. 4, it can be seen that a crab 33 is measured by placing the crab between adjacent fins that extend from the measuring device 10. If the crab 33 is wider than the span between fins, then the crab 33 can be kept. If the crab's shell does not extend between the adjacent fins, then the crab 33 must be returned to the water.

Again returning to FIG. 1, it can be seen that apertures 40, 42 are formed through the body 12 of the measuring device 10. The apertures 40, 42 each have a predetermined diameter D1, D2. In the shown embodiment, a large aperture 40 is provided for clams. A smaller aperture 42 is provided for muscles. Additional apertures can be provided for any species of shellfish that is measured by the girth of its shell. Additionally, measured lengths such as the length L5 of the tail fin 20 and the length L6 between the shark's teeth can also be used to measure the length and width of shellfish. Referring to FIG. 5, it can be seen that to measure shellfish 34, the shell of the shellfish 34 is passed through the appropriately sized aperture 40, 42. If the shellfish 34 passes through the aperture, the girth of the shellfish 34 is below the acceptable minimum and the shellfish 34 must be returned to the water. If the shellfish 34 can not be passed through the appropriate aperture, then the girth of the shellfish 34 is above the acceptable minimum and the shellfish can be kept. If a local regulation requires that a type of shellfish be measured by its width or thickness, the shellfish can be placed between the tail fin 20 of the measuring device 20 or in the teeth of the measuring device 10. The tail fins provide a yes/no gauge for the width of a shellfish 34, while the teeth provide a yes/no gauge for the thickness of a shellfish.

From the above description, it can be seen that the present invention measuring device is capable of measuring fish, crustaceans and shellfish in a simple and rapid manner. A fisherman would then only have to carry the measuring device with him/her in order to measure most any creature in a given body of water.

It will be understood that the various figures described above illustrate only a one preferred embodiment of the present invention. A person skilled in the art can therefore make numerous alterations and modifications to the shown embodiment utilizing functionally equivalent components to those shown and described. All such modifications are intended to be included within the scope of the present invention as defined by the appended claims.

What is claimed is:

1. A measuring device, comprising:
    a planar element having an elongated body extending between two ends, wherein one end of said elongated body is shaped as a tail fin, having an upper fin and a lower fin that are a predetermined distance apart, and said predetermined distance corresponds to the minimum size of a sea creature selected from a group consisting of fish, crustaceans and shellfish;
    at least one marking disposed on said elongated body between said two ends, wherein a first distance exists between said at least one marking and a reference point that corresponds to a legal minimum length of at least one species of fish; and
    at least one protrusion extending from said elongated body between said two ends, wherein a second distance exists between said at least one protrusion and a reference point that corresponds to the minimum acceptable length of said sea creature selected from a group consisting of fish, crustaceans and shellfish.

2. The device according to claim 1, wherein said elongated body is shaped as a fish and said at least one extension are shaped as fins extending from the fish.

3. The device according to claim 1, wherein a plurality of protrusions extend from said elongated body and a distance exists between each of said plurality of protrusions that corresponds to the acceptable minimum length of a plurality of different species of crustaceans.

4. The device according to claim 1, further including at least one aperture formed in said elongated body, wherein said at least one aperture is sized to correspond to the minimum acceptable girth of at least one species of shellfish.

5. The device according to claim 4, wherein a plurality of apertures are formed in said elongated body, wherein each of said apertures corresponds in size to the minimum acceptable girth of a species of shellfish.

6. The device according to claim 3, wherein one of said protrusions terminates with a hooked structure that is adapted to engage the collar of a lobster's shell.

7. The device according to claim 1, wherein a distance exists between said two ends that corresponds to the minimum legal length of a species of fish.

8. The device according to claim 1, wherein said at least one marking is configured as a plurality of markings, wherein each of said markings is indicative of the minimum legal length of a different species of fish.

9. A device for measuring fish, crustaceans and shellfish, comprising:

a planar element shaped as a fish, having a head, a tail fin, a top fin and a bottom fin, wherein a first space exists between said tail fin and said top fin that corresponds to the minimum acceptable length of a first species of crustacean and a second space exists between said tail fin and said bottom fin that corresponds to minimum acceptable length of a second species of crustacean; and at least one marking disposed on said planar element between said head and said tail fin, wherein a first distance exists between said at least one marking and said tail fin that corresponds to the legal minimum length of at least one species of fish.

10. The device according to claim 9, wherein said at least one marking is configured as a plurality of markings, wherein each of said markings is indicative of the minimum legal length of a different species of fish.

11. The device according to claim 1, wherein a distance exists between said head and said tail fin that corresponds to the minimum legal length of a species of fish.

12. The device according to claim 9, further including at least one aperture formed in said planar element, wherein said at least one aperture is sized to correspond to the minimum acceptable girth of at least one species of shellfish.

13. The device according to claim 9, wherein a plurality of apertures are formed in said planar element, wherein each of said apertures corresponds in size to the minimum acceptable girth of a species of shellfish.

14. The device according to claim 9, wherein said tail fin has an upper fin and a lower fin that are a predetermined distance apart, wherein said predetermined distance corresponds to the minimum size of a sea creature selected from a group consisting of fish, crustaceans and shellfish.

15. An improved measuring device, comprising:

a rigid element having a reference point and a plurality of markings different distances from said reference point, wherein each of the distances between said reference point and said markings corresponds to the legal minimum length for a different species of fish;

a plurality of protrusions extending from said rigid element, wherein distances between said reference point and said protrusions correspond to a legal minimum size of sea creatures selected from the group consisting of fish, crustaceans and shellfish; and at least one aperture formed in said rigid element, wherein said at least one aperture is sized to correspond to a minimum acceptable girth of at least one species of shellfish.

16. The device according to claim 15, wherein a plurality of apertures are disposed in said planar element, wherein each of said apertures corresponds in size to the minimum acceptable girth of a species of shellfish.

* * * * *